United States Patent Office 3,048,443
Patented Aug. 7, 1962

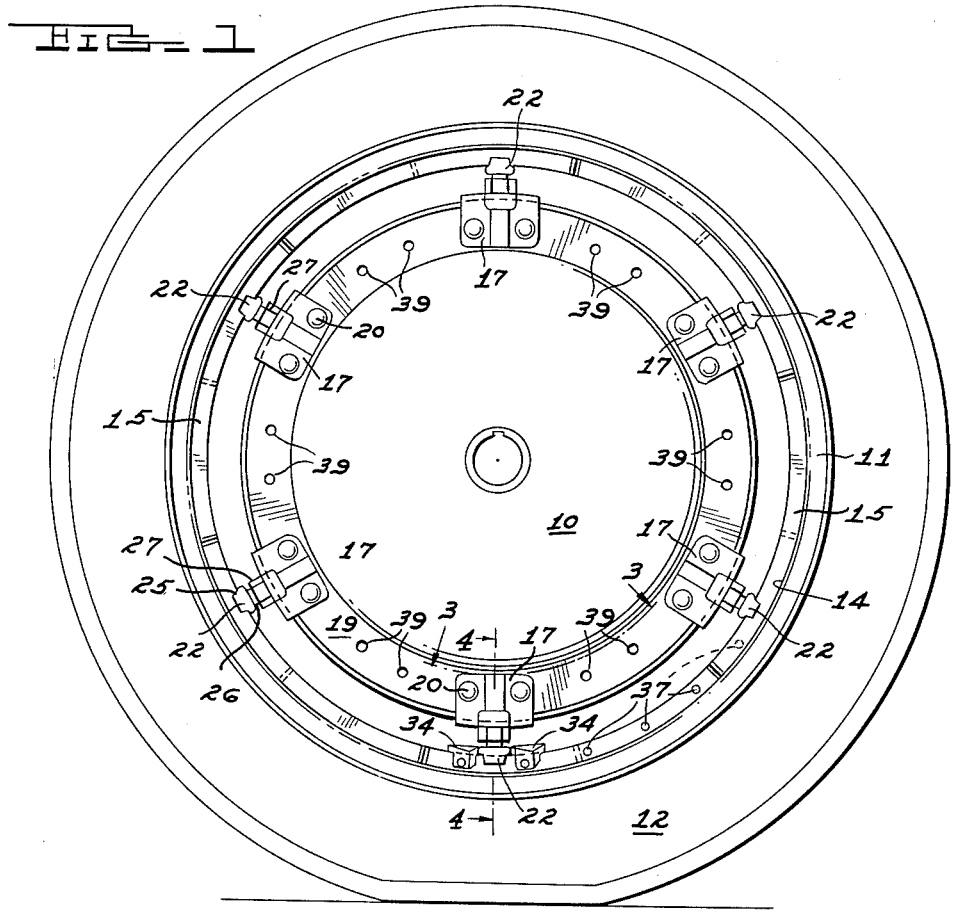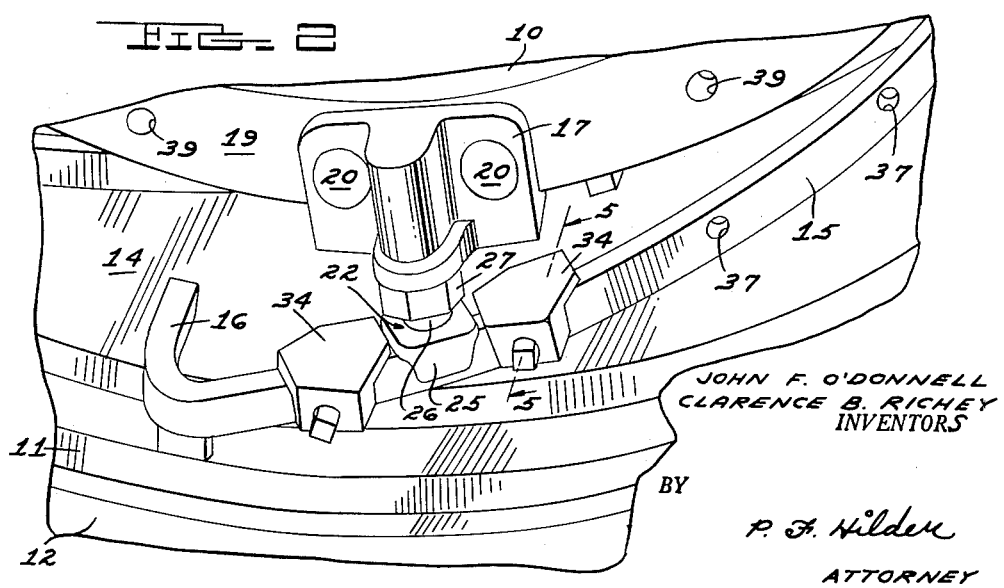

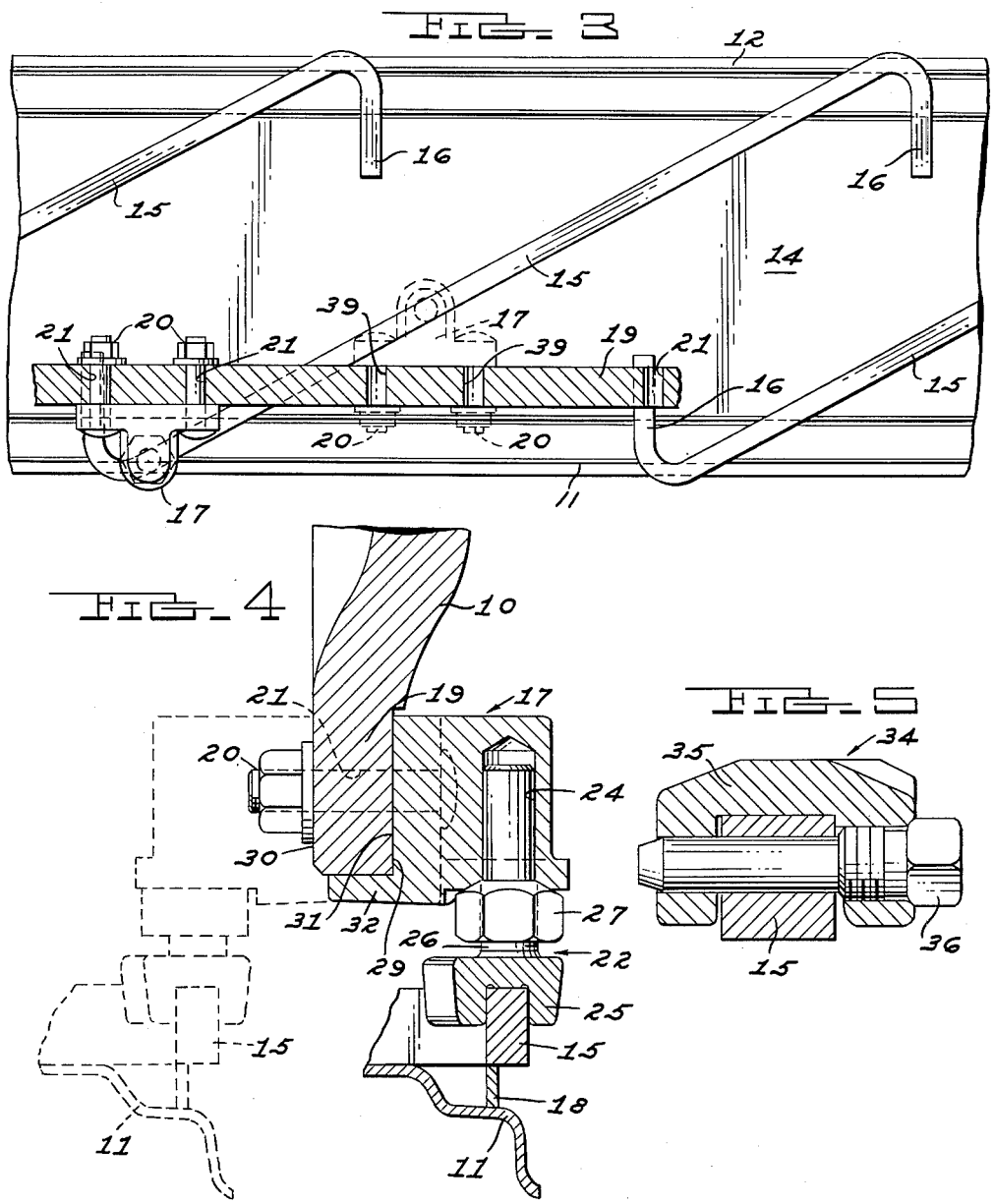

3,048,443
ADJUSTABLE TREAD WHEEL
John F. O'Donnell, Rochester, and Clarence B. Richey, Royal Oak, Mich., assignors to Ford Motor Company, Dearborn, Mich., a corporation of Delaware
Filed Feb. 24, 1961, Ser. No. 91,485
4 Claims. (Cl. 301—9)

This invention relates to adjustable tread wheels of the type used on agricultural tractors.

Agricultural tractors frequently are provided with wheels in which the rim portion, including the tire, is axially adjustable to vary the tread width between wheels as required for plowing, cultivating, etc. Tractor rear wheels usually are power adjustable, i.e. the rim portion is provided with circumferentially spaced helical rails engaged by brackets secured at intervals to the periphery of the wheel disc. The wheel is adjusted by loosening the engagement of the brackets with the rails and applying power to the rear wheels of the tractor to rotate the disc relative to the rim and thus turn the rim in or out for decreasing or increasing tread distance, after which the brackets are retightened against the rails.

The wheel of the present invention is of the type above-described. However, in order to obtain a greater range of adjustment of wheel tread without sliding the hub on the axle or removing and exchanging the rear wheels side for side, the brackets for supporting the rim from the wheel disc engage the rail in a position offset several inches from the disc, the brackets being removable one by one and capable of being reversed for mounting to project from the other side of the disc and engage the same or another rail. By reversing the brackets the range of adjustment of the wheel is increased substantially, without requiring that the heavy wheel be removed and exchanged with the other rear wheel, or even requiring that the wheel be jacked off the ground.

Among the objects of the present invention are to provide an improved adjustable tread wheel which is capable of increased range of adjustment; which may be adjusted using the tractor drive as power, and without jacking the wheel off the ground; to provide such a wheel which is simple, and durable in use and economical to manufacture, and generally to improve tractor wheels of the type described. Other objects and objects relating to details of manufacture and use will be more apparent from the detailed description to follow.

Our invention is clearly defined in the appended claims. In the claims, as well as in the description, parts may at times be identified by specific names for clarity and convenience, but such nomenclature is to be understood as having the broadest meaning consistent with the context and with the concept of our invention as distinguished from the pertinent prior art. The best form in which we have contemplated applying our invention is illustrated in the accompanying drawings forming part of this specification, in which:

FIGURE 1 is a side elevation of a tractor wheel embodying the present invention.

FIGURE 2 is a fragmentary perspective showing the engagement of a wheel disc bracket with a spiral rail of the rim.

FIGURE 3 is a fragmentary section of the tractor wheel, taken along the line 3—3 of FIGURE 1 and developed onto a flat plane.

FIGURE 4 is a fragmentary radial section of the wheel taken along the line 4—4 of FIGURE 1, alternative positions of the rim supporting bracket and rim being indicated in broken lines.

FIGURE 5 is a radial section through one of the rail stops, taken along the line 5—5 of FIGURE 2.

Referring now to the drawings, and particularly to FIGURE 1, the adjustable tread wheel of the present invention comprises a wheel disc 10 which is adapted to be secured to a rear axle shaft, not shown, of a tractor and a rim 11 which is adjustable axially of the wheel and which supports a more or less conventional tire 12. Ordinarily, the wheel structure of the present invention will be used in pairs, one wheel being on each side of the vehicle so as to permit an axial tread adjustment to vary the spacing between the wheels. The device of the present invention is particularly suited for power-driven wheels, e.g. the rear wheels of an agricultural tractor.

The inner circumference 14 of the rim 11 is provided with a series of circumferentially spaced, helically extending rails 15 which may be secured to the rim by welding or otherwise. The rails 15 are uniformly spaced about the inner circumference of the rim 14 and project radially inwardly of the rim a short distance. The rails 15 preferably are six in number, each rail extending axially for the width of the rim and overlapping the adjacent rail slightly, see FIGURE 3. The ends 16 of the rails preferably are formed to extend in an axial direction towards the center of the rim. If desired, a filler block 18 may be used to support the end portion of each rail 15 from the rim. This rim construction is more or less conventional.

A series of brackets 17 are provided for supporting the rim 11 from the wheel disc 10. Preferably, one bracket 17 is provided for each rail 15. The brackets 17 are secured to the peripheral portion 19 of the wheel disc 10 at uniform intervals by mounting bolts 20 received within a series of pairs of holes 21, each pair of holes 21 being uniformly spaced along the peripheral portion of the wheel disc.

Each bracket 17 is provided with a lug bolt 22 extending radially outwardly within a smooth bore 24 in the body of the bracket and having an outer end portion 25 of U-shaped cross-section adapted to fit about one of the rails 15. Each lug bolt 22 has a threaded shank 26 receiving a nut 27 which may be turned against the bracket to force the lug bolt radially outwardly tightly into engagement with the rail.

Each bracket 17 is adapted for mounting to project from either the front or back face of the wheel disc 10, the lug bolt 22 being offset substantially from the peripheral portion 19 of the wheel disc. To facilitate reversal of the brackets 17 on the wheel disc 10, the peripheral portion 19 of the disc is provided with flat, radially extending opposite faces 29 and 30 against which a flat radially extending surface 31 of each bracket is adapted to be clamped by the mounting bolts 20. If desired, the brackets 17 each may be provided with a flange 32 overlying the peripheral portion 19 of the wheel disc.

In normal operation of the tractor, the wheel disc 10 and rim 11 rotate as a unit, the lug bolts 22 being forced out into firm frictional engagement with the rails 15 to prevent relative movement between the disc and rim. To prevent relative movement in the event one or more of the lug bolts 22 should become loosened, a pair of stops 34 may be provided for one of the rails 15. Each stop 34 consists of a C-shaped body portion 35 adapted to fit over the rail and having a bolt 36 extending between the legs of the body portion 35 and being received within one of a series of spaced holes 37 formed along one of the rails 15. As indicated in FIGURE 2, one of the stops 34 may be positioned on each side of one of the lug bolts 22 to prevent movement of the lug bolt along the rail in the event that several of the lug bolts should become loosened so as to permit relative movement between the rim and disc.

The wheel of the present invention is of the power adjustable type, in which each of the rear wheels may be adjusted by slightly loosening at least three adjacent lug bolts 22, preferably the bolts above the axle. Then, upon removing one or both of the stops 34 and applying power through the drive train of the tractor tending to rotate the wheels, the wheel disc 10 will be rotated relative to the rim 11 so as to cause the lug bolts 22 to move along the length of the rails 15 and force the rim and tire axially inwardly or outwardly depending on the direction in which the disc is rotated. Hence, it is unnecessary to jack the wheel up from contact with the ground. In order to facilitate adjustment to the proper position, one of the stops 34 may be repositioned along the rail 15 to stop relative movement between the wheel disc and rim when the predetermined amount of adjustment has been obtained. The adjustment of the lug bolts 22 by movement along the rails 15 will provide an axial tread adjustment of each wheel approximately equal to the width of the rim.

Adjustment beyond the range permitted merely by rotating the rim 11 relative to the disc 10 is provided by removing the brackets 17 one by one from the wheel disc 10 and mounting the brackets in a second set of holes 39 provided in the peripheral portion 19 of the disc intermediate the pairs of holes 21, the brackets in their newly mounted position extending from the opposite face of the wheel disc. Referring to FIGURE 3, it will be noted that the second set of holes 39 is spaced along the peripheral portion 19 of the wheel disc the proper distance with relation to the offset of the lug bolt 22 from the wheel disc and the slope of the rails 15 so that, when the bracket is remounted to project from the other side of the wheel disc, the lug bolt 22 will be in a position to engage the same or the next adjacent rail. Preferably, the second set of holes 39 is located midway between the first set of holes 21, and the offset of the lug bolts 22 of the brackets is such that twice the offset of the lug bolts plus the thickness of the peripheral portion 19 of the wheel disc is equal to the slope or axial offset of the rails 15 for the angular distance between the sets of holes 21 and 39, shown as 30° in the drawings. Accordingly, to obtain maximum range of adjustment of the rim, either inwardly or outwardly, the brackets may be removed one by one from the wheel disc, mounted on the reverse side of the disc and reengaged with a rail 15. The brackets in the upper half of the wheel disc at any time will not be bearing the weight of the tractor, and may be loosened and removed without jacking the wheel off the ground. In this fashion, a second range of adjustment in addition to that permitted by the spiral rails may be obtained, the additional adjustment consisting of twice the offset distance of the lug bolts 22 from the wheel disc plus the thickness of the wheel disc itself.

The construction of the present invention makes it unnecessary to reverse the wheel discs and tires side for side or to shift the wheel axially of the axle shaft in order to obtain the full range of adjustment required in operation of the tractor for various farm uses.

We claim:

1. In an axially adjustable wheel tread structure, a rim having a plurality of circumferentially spaced, helically extending rails on the inner circumference thereof, a wheel disc having a peripheral portion, brackets engaged one with each rail and secured to the disc at intervals along the circumference thereof to support the rim from the disc, each bracket having a disc-engaging portion and a rail-engaging portion offset substantially axially of the wheel disc from the disc-engaging portion, the disc having a first series of holes in its peripheral portion adapted to receive the brackets with the rail-engaging portions extending from a common side of the disc, and a second series of bracket mounting holes in the peripheral portion of the disc intermediate the first series of holes and so located with respect to the rails as to receive the brackets with the rail-engaging portions extending from the opposite side of the disc and engaged with the rails without displacement of the rim relative to the disc.

2. In an axially adjustable wheel tread structure, a rim having a plurality of circumferentially spaced, helically extending rails on the inner circumference thereof, a wheel disc having a peripheral portion, brackets engaged one with each rail and secured to the disc at intervals along the circumference thereof to support the rim from the disc, each bracket having a disc-engaging portion and a rail-engaging portion offset substantially axially of the wheel disc from the disc-engaging portion, the disc having a first series of holes in its peripheral portion adapted to receive the brackets with the rail-engaging portions extending from a common side of the disc, and a second series of bracket mounting holes in the peripheral portion of the disc midway between the first series of holes, the offset of the brackets being such that when the brackets are reversed to project from the opposite side of the disc and are received in the second series of holes, the rail-engaging portions will be positioned to engage the rails without displacement of the rim relative to the disc.

3. In an axially adjustable wheel tread structure, a rim having a plurality of circumferentially spaced, helically extending rails on the inner circumference thereof, a wheel disc having a peripheral portion, brackets engaged one with each rail and secured to the disc at intervals along the circumference thereof to support the rim from the disc, each bracket having a disc-engaging portion and a rail-engaging portion offset substantially axially of the wheel disc from the disc-engaging portion, the rail-engaging portion consisting of a lug bolt extending radially of the wheel and adapted to be moved radially outwardly into engagement with one of the rails and the disc having a first series of holes in its peripheral portion adapted to receive the brackets with the rail-engaging portions extending from a common side of the disc, and a second series of bracket mounting holes in the peripheral portion of the disc intermediate the first series of holes and so located with respect to the rails as to receive the brackets with the rail-engaging portions extending from the opposite side of the disc and engaged with the rails without displacement of the rim relative to the disc.

4. In an axially adjustable wheel tread structure as claimed in claim 1, the wheel disc having parallel, radially extending surfaces along its peripheral portion for receiving complementary portions of the brackets; the brackets being mountable to project from either side of the wheel disc.

References Cited in the file of this patent

UNITED STATES PATENTS 2,793,913    Stough _____ May 28, 1957

FOREIGN PATENTS 850,745    Great Britain _____ Oct. 5, 1960